United States Patent [19]

Nielsen

[11] 4,000,532
[45] Jan. 4, 1977

[54] FENDING DEVICE FOR OIL CONTAINMENT BOOM

[76] Inventor: Erik C. Nielsen, R.D. 3 Box 360-K, Toms River, N.J. 08753

[22] Filed: Mar. 5, 1975

[21] Appl. No.: 555,366

[52] U.S. Cl. .................................... 9/8 R; 61/1 F; 114/270; 114/256; 114/219

[51] Int. Cl.² .................. B63B 35/00; E02B 15/04

[58] Field of Search ............ 114/0.5 F, 0.5 T, 219; 9/8 R; 61/1 F

[56] References Cited
UNITED STATES PATENTS

| | | | |
|---|---|---|---|
| 3,321,923 | 5/1967 | Smith et al. ................. | 114/0.5 T |
| 3,353,610 | 11/1967 | Vidal ......................... | 61/1 F |
| 3,430,958 | 3/1969 | Lakeman .................... | 9/8 R |

*Primary Examiner*—Trygve M. Blix
*Assistant Examiner*—Gregory W. O'Connor
*Attorney, Agent, or Firm*—John J. Gallagher

[57] ABSTRACT

A fending device for oil containment booms. A floating, open structure with vertical fenders extending above and below the waterline breasts oil boom away from vessels and other structures.

10 Claims, 11 Drawing Figures

FENDING DEVICE FOR OIL CONTAINMENT BOOM

BACKGROUND OF THE INVENTION

Oil booms or barriers are in general use today for containing oil slicks floating on water. They usually consist of elongated structures with a floatation collar and a depending skirt which blocks passage of oil underneath the collar.

Increasingly, local laws and regulations are requiring the use of oil booms in conjunction with the loading or offloading of petroleum carrying vessels whether or not a spill has taken place. When an oil spill has occurred, or there is a present danger of one occurring from a vessel, Federal law requires that booms or other containment means be used around the vessel.

When oil booms are used in conjunction with vessels, two major problems are encountered. First, to be effective in containing oil discharged from a vessel, a boom must be held away from the hull of a vessel since a discharge from either above or below the waterline of the vessel will enter the plane of the water surface several feet away from the hull depending on the current and wind direction and velocity. The greater the distance of spacing of the boom, the better the likelihood of safe containment under most conditions. A distance of 10 feet, for example, should handle most expected conditions. When influenced by wind and/or current, an unrestrained oil boom will tend to cling to the vessel's hull, at least along a portion of the waterline thereof. Breasting the boom away from the vessel hull is now a legal requirement in some localities. A second important problem involving vessels in conjunction with oil booms occurs when the vessel involved is a steamship. For technical reasons related to the ship's power plant, steamships must keep their propellers turning constantly to remain in a condition to get underway. This is accomplished, when the ship is moored or at anchor, by means of "jacking gear" which slowly jacks the propeller shaft over to maintain the required rotation. When steamships are to be "boomed off" it is imperative that the boom be kept away from the wheel otherwise it will be caught up by the slowly rotating propeller and destroyed with an attendant possibility of damage to the ship's propulsion gear. The above problems are dealt with at present by anchoring segments of the boom away from the hull and propeller of the boomed off vessel to provide the required spacing. The forces generated by current and wave forces on oil boom restraints can be quite large rendering anchors unreliable unless large, sophisticated anchoring systems are used. Anchoring systems are also vulnerable to marine traffic which is generally quite heavy and closely confined in many harbors where fuel and cargo transfer operations take place. Conventional fending devices such as camels, where available, tend to be quite heavy and difficult to maneuver, particularly with the small boats normally used to tend boom. Camels are also quite expensive if they are to be maintained solely for the purpose of oil boom handling and would have to be quite large to stand a boom away from a propeller which may be as much as 15 feet in radius.

SUMMARY OF THE INVENTION

This invention provides a durable fending device of suitable size for floating objects such as oil barriers which has a maximum strength/weight ratio by furnishing a structure formed from a high strength material in a relatively large span structurally efficient configuration.

The invention also provides a device for fending floating objects having a large span which may be readily assembled from components of conventional shipping size by furnishing a structure which is made up of units of conventional size formable into structural elemets or substructures which can be connected by standard fastening means into an efficient overall large span structure.

The invention, in one embodiment, provides a fending device which can be assembled in different sizes to meet particular size requirements by furnishing modular elements or substructures which are interchangeable and are assembleable in different multiples to provide an overall assembly of the desired size.

The invention is essentially composed of an open planar fending structure of high strength/weight ratio. This is accomplished by forming the structure of an elongated member or members having high bending and compressive strength (elongated members) and in particular embodiments, by bracing these members in bending with elements having only high tensile strength (tensile elements) as is described in greater detail below. In one embodiment, the elongated members are disposed in a radiating pattern to take loading primarily in compression with the tension elements interconnecting the free ends of the members in a circumferential direction. In the preferred embodiments to be described in more detail below, the elongated member takes a ring shape to absorb loading primarily in bending with the tension elements disposed in a bracing, chordwise or radial pattern. In either variation, an open planar structure of relatively high span and high strength/weight ratio is achieved. The more structurally efficient the structure, the greater the strength/weight ratio as will be described in more detail below.

In a preferred embodiment, the invention provides a device for fending off oil booms which comprises a relatively large span open ring of high finess ratio made up of three structurally continuous elongated members, means to interconnect the members to form the ring, floatation associated with the ring to provide floatation of the ring parallel-planar to the surface of the water and fending guards extending from the members transversely of the plane of the ring to restrain passage of the boom over or under the ring. It should be understood that the term "ring" as used herein is intended to mean any open geometrical shape, preferably one that lends itself to redundant construction such, for example, as a circular ring, a distorted ring (ellipse, etc.) or a triangular structure.

Relatively large span is intended to mean spans in excess of about 4 feet diameter while high finess ratios are defined as ratios of span to member thickness in excess of about 15.

These and other objects and many of the attendent advantages of the invention will become better understood to those skilled in the art by reference to the following detailed description when viewed in light of the accompanying drawings wherein like components throughout the figures thereof are indicated by like numerals and wherein:

BRIEF DESCRIPTION OF THE DRAWINGS

FIG. 2 is an elevational view of the embodiments of FIG. 1a;

DESCRIPTION OF A PREFERRED EMBODIMENT

Figure 1A:
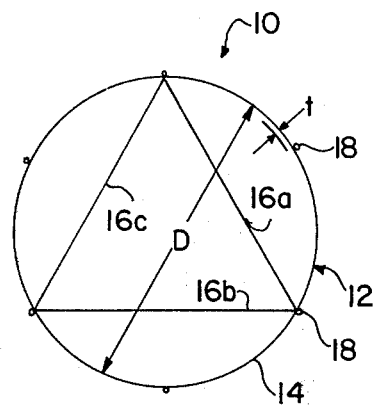
FIGS. 1a through 1c are plan views of 3 embodiments of the invention.

Referring now to the embodiment of FIG. 1a, the device 10 is made up in the form of a ring 12 comprised preferably of an elongated member 14 formed to close on itself to provide an open geometrical shape of high finess ratio (D/t) such that a relatively large span (D in excess of about 4 feet) with minimum weight is provided. The member itself may be made of a bouyant structural material such as a foam filled tube or a sealed air filled member; of structural materials denser than water with floatation materials associated therewith or of combinations of the above. The member may be rigged and formed into the shape required to complete the ring or it may be made of a flexible material such as fiber reinforced plastic and formed into a ring by flexure of the member at time of assembly. Due to the relatively large size of the assembled device it is highly desireable, as will be described in greater detail below, that the member 14 be segmented, so that a compact shipping and storing configuration is available, and readily assemblable so that the device can be quickly assembled on the site and, if necessary, readily disassembled and reassembled if storage or use conditions so dictate.

In so far as the configuration of the ring 12 is concerned, it is preferred that the simplest structural shape be achieved. From this standpoint, a round ring, as illustrated, distorted rings such as ellipses and oblate configurations or any trioblate or ternary structure such as triangles or the like will provide a redundant form such that additional complicating structure such as corner bracing or reinforcing will not be required to maintain the configuration.

As indicated above, an object of the invention is to achieve the simplest structural configuration with the highest strength/weight ratio. If the device is in the form of a ring as shown or a distorted ring, forces tending to deform the ring will be resisted by a force proportional to the strength of the ring material in bending. If the bending moments were to be properly resisted over large spans, the ring thickness ($t$) would have to be suitably increased according to principles well known in the art, thereby reducing the overall strength/weight ratio. A very effective way of maintaining a high finess ratio without reducing the strength/weight ratios by adding substantial weight to the device, is achieved by utilizing tension elements to effectively reduce the span of the ring material which must resist bending and therefore reduce the bending moment. Since the tension elements are subjected only to tension and not bending or compression, they can have a very low thickness over length ratio and therefore high strength/weight ratio. These tension elements take the form of cables 16a, 16b and 16c in the embodiment of FIG. 1a; The cables 16 are arranged to form a redundant structure, in this instance a single triangle or delta form for the purposes described above. The cables 16a, 16b and 16c essentially take all of the gross forces tending to deform the ring 12 in general leaving the segments of the member 14 between the points of support by the triangle formed by the cables to take up local bending loads. For the same loading, the thickness of the member 14 can be much less with the use of the cables 16a, b and c than it could be unsupported since the bending moments thereon are much reduced. The relatively low weight of the cables also does not substantially decrease the strength/weight ratio. For the ring form then, the cable reinforced ring provides the simplest configuration with the highest strength/weight ratio structure. As the form of the ring approaches an angular configuration such as a triangle, the legs or segments of the member 14 become less arcuate and the forces inposed thereon are more in tension and compression and those in bending are reduced. At some point as the legs approach a linear form, as can be readily determined by methods known in the art for the particular structure and composition involved, the simplest and most efficient structural configuration will be achieved without the need for tension elements since the ring structure itself can absorb the reduced bending loads as a column without undue increase of thickness to resist bending.

Figure 2:
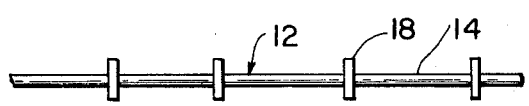

Referring to FIG. 1a, a series of fenders 18 are attached to the ring 12 perpendicular to the plane of the ring preferably to extend above and below the ring as is best seen in FIG. 2. These fenders 18 may be in the form of independent members as shown or may consist of a continuous member or fence either independently added to the ring 16 or formed as part of the ring during fabrication thereof so long as the primary purpose, blocking of floating boom or other objects from passage under or over the ring, is met. The number and disposition of the fenders 18 is also governed by the above.

Figure 1B:
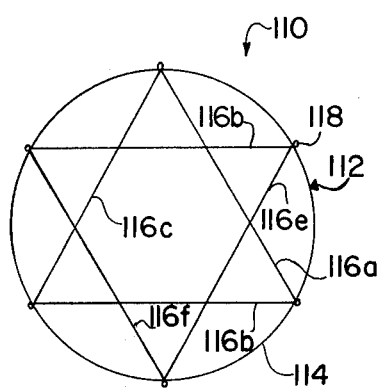
Figure 1C:
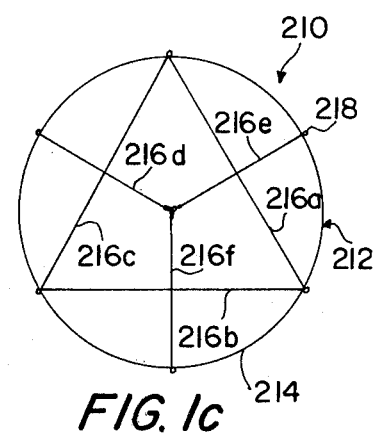

In FIGS. 1b and 1c a variation of the arrangement of tension elements is illustrated. Components of these Figures corresponding to like components of the preceeding Figure are indicated by like numerals of the next higher order. If the local bending forces are so great as to require sacrifice of the most efficient strength/weight structure by requiring unsuitable increase of thickness of the elongated member 12 in the configuration of FIG. 1a, the bending moments can be further reduced by the tension element arrangements of FIGS. 1b or 1c. In FIG. 1b, additional cables 116d, 116e and 116f are added as a triangle to form a double delta, the triangle formed thereby rotated from the position of the triangle formed by cables 116a, 116b and 116c so that the arcuate lengths of the member 114 between supports is equal. This reduced arcuate length of the member obviously reduces the bending moments imposed thereon and therefore reduces the required thickness and weight of such member.

In FIG. 1c, the result of the embodiment of FIG. 1b is achieved with a different arrangement of the tension elements. In this embodiment, the cables 216d, and 216e and 216f are arranged in a "Y" configuration which, structurally, yields the same result as the delta arrangements of FIGS. 1a and 1b. Again the locus of the termination points on the ring 212 is offset from the corners of the triangle formed by cables 216a, 216b and 216c so that equal arc lengths of the member 214 exist between each point of support. Since the structural result of the "Y" configuration, or any other ternary structure is essentially the same is that of the delta, it is obvious that a "Y" configuration of cables alone, a series of "Y" cable configurations or various combinations of "Y" and delta forms in different rotational relationships can be employed in accordance with the conditions set forth above to achieve the desired result of simplicity of construction with the maximum strength/weight ratio.

FIG. 1c also provides a pattern for a possible variation described above in the Summary Of The Invention. Instead of a ring form, the member 212 could assume a radial disposition in place of the elements or cables 216d, 216e and 216f. The delta formed by the cables 216a, 216b and 216c could then be rotated 60° to interconnect the ends of the members to form the structure described above.

As stated above, the device, due to its relatively large assembled size, is preferably designed to be broken down into relatively small components for storage and shipping and be readily assembly and disassembled in the event space and/or use conditions so require. FIGS. 3 through 8 illustrate, in detail, one such device which satisfies the above requirements and also provides variable sized devices through its particular construction. FIG. 9 illustrates the mode of use of devices in accordance with the invention.

Figure 3:
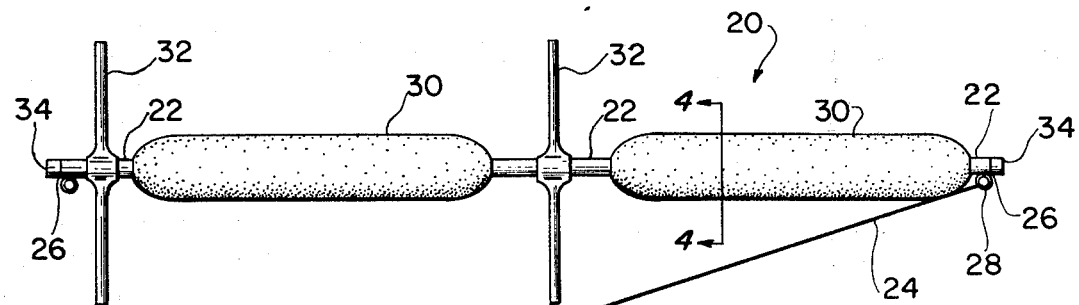
FIG. 3 is an elevational view of an element of another device in accordance with the invention.
Figure 5:
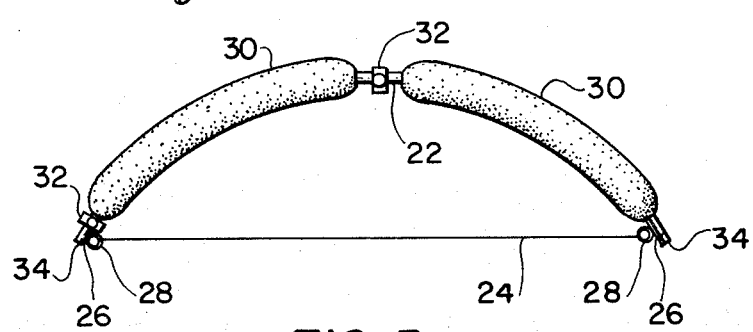
FIG. 5 is a plan view of the element of FIG. 2 connected and ready for assembly.
Figure 6:
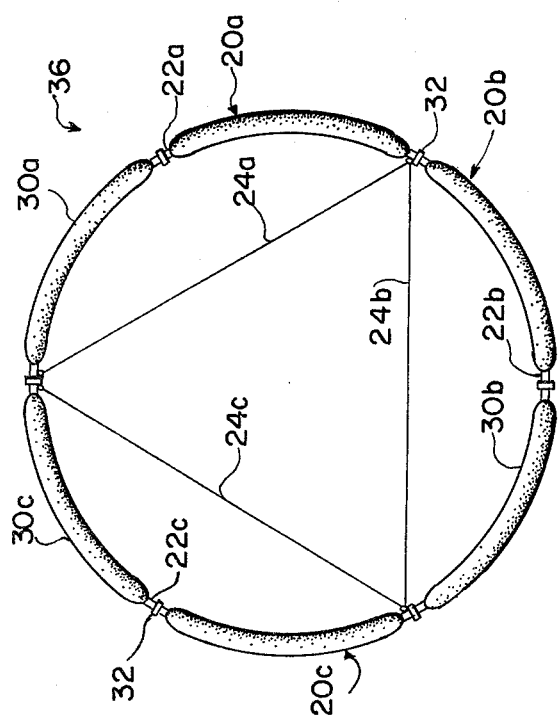
FIG. 6 is a plan view of a device in accordance with the invention assembled from three elements of the type shown in FIG. 5.

In FIG. 3 an element 20, of the detailed embodiment, comprises an elongated member 22 formed of a flexible rod of corrosion resistant high strength/weight material such as fiber-reinforced plastic or the like. A tension element 24, comprising a galvanized cable, is connectable to each end of the member 22 (FIG. 5) by means of mating connectors 26 on each end thereof and connectors 28 on each end of the tension element 24. These connectors can be of any type known in the art such, for example, as snap hooks and eyes. In the embodiment described herein the elongated members 12 are intended to be bowed as shown in FIG. 5 so that the resulting device will be provided with a relatively smooth external surface. As was described in greater detail above, desired surface conditions can be achieved by means other than by bowing the member and, in those instances, the tension element 24 will not be required. Where the member is to be bowed, the tension element 24 should be of such length that, when the element is bowed as in FIG. 5, the elongated member 22 forms an arc which is one third of the circumference of a complete ring formed by three elements as shown in FIG. 6. The relationship should be as follows:

Length of member 22/Length of element 24 = 0.83

Ratios higher than 0.83 will produce completed structures tending toward a triangular shape which, although structurally more efficient, will offer sharp corners which will tend, without further precautions, to damage oil boom. As stated above, it is envisioned that straight elements 20 (Ratio of 1.0) can be utilized, however, in such cases the three corners formed by the element joints will have to be guarded. A spherical encasement of each corner would, for example, double as a corner guard and floatation means for this variation. Ratios less than 0.83 will produce overall structures tending towards a clover or petaled configuration which, while not producing undesirable corners, are structurally less efficient than the higher ratios. It is preferred, in the embodiment specifically described herein, that the member 22 be initially straight and bowed into the proper arc as described above, however, the member can be preformed into the arcuate shape if so desired. If the member is preformed, the tension element 24 is still preferred so that the highest strength/weight ratio structure is provided.

Buoyant floatation members 30, preferably of expanded plastic foam such as polyethylene or the like, are disposed on or the elongated member 22 as shown. A protective coating 31 (FIG. 2), such as urethane plastic, can be provided over the floatation member 30 to prevent wear and mechanical damage thereto. As stated above, the elongated member 22 may be made of buoyant material, doing away with the need for separate floatation members 30.

Figure 4:
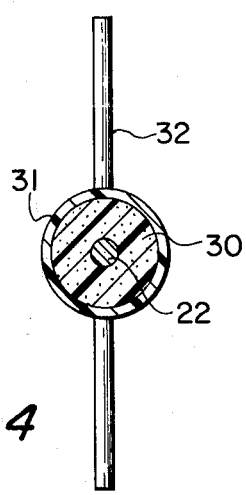
FIG. 4 is a sectional view of the element of FIG. 3 taken along the line 4—4 thereof.

As is best seen in FIG. 4, fenders 32 are mounted on the elongated member 22 to project, as seen in FIG. 5, perpendicular to the plane of the arc formed by the member. As shown, one fender 32 is mounted proximate one end of the member 22 and the other proximate the midportion thereof.

An end connector 34 is provided on each end of the elongated member 22 to provide end-to-end connection with like elements in the formation of a device in accordance with the invention as will be described below. The connections can be of any of the many types known in the art such, for example, as screw fasteners, socket, pin or the like, so long as structural rigidity is provided for the joint in at least directions out of the plane of the arc formed in FIG. 5.

In FIG. 6, three elements 20a, 20b, and 20c are connected end-to-end to form a device 36 according to the invention. The elongated members 22a, 22b, and 22c form a ring from which fenders 32 extend perpendicularly proximate each joint 38 and midway between each joint. In this configuration, the tension elements 24a, 24b, and 24c aid in maintaining the circular ring configuration under loading and the floatation members 30a, 30b, and 30c provide floatation for the device 36, maintaining it substantially coplanar with the surface of the water.

Figure 7:
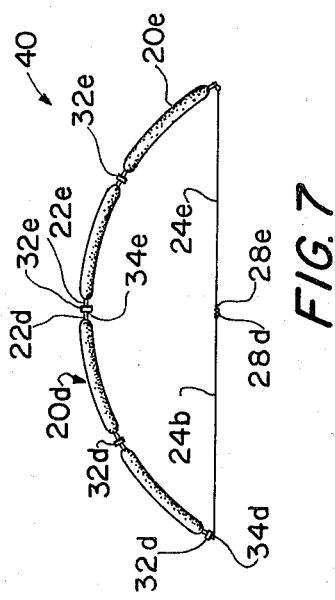
FIG. 7 is a plan view of an elemental construction made up of two of the elements of FIG. 3 connected for assembly into a larger device in accordance with the invention.

In FIG. 7, a variation in accordance with the invention is shown. As will be explained in greater detail hereinafter, certain operational conditions require larger area span fending devices than do others. This invention provides for increased size by furnishing a capability to assembly two elements 20d and 20e into an elemental construction 40 as shown in FIG. 7 by connecting the free ends of the elongated members 22d and 22e and the free ends of tension elements 24d and 24e. Connection between members 22d and 22e for the purposes of the embodiment of FIG. 7 must be rigid in all planes. In this manner, a construction identical in form but double in size to that of FIG. 5 is provided.

Figure 8:
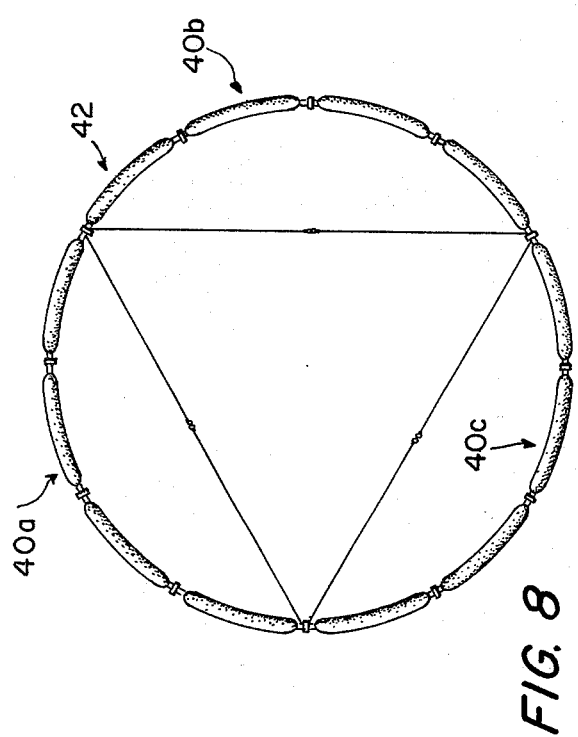
FIG. 8 is a plan view of a larger area span device in accordance with the invention assembled from three elemental constructions of the type shown in FIG. 7.
Figure 9:
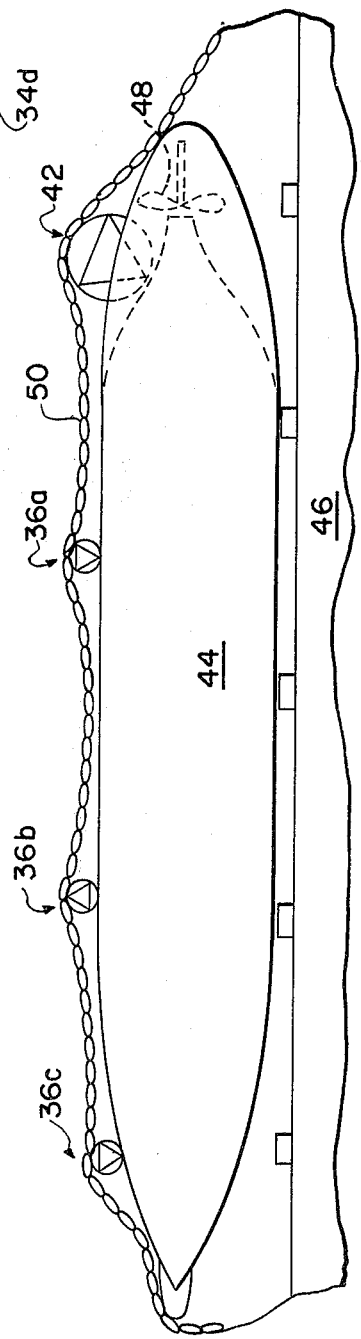
FIG. 9 is a plan view illustrating a mode of use of the devices of FIGS. 6 and 8 in accordance with the invention.

FIG. 8 illustrates a device 42 assembled from three elemental constructions 40a, 40b and 40c in a manner identical to that of the assembly of the device 36 of FIG. 6 with an area span twice that device.

In FIG. 9, the operation of devices in accordance with the invention is illustrated. Although specifically described in use in conjunction with a steamship moored alongside a pier, it should be obvious that the devices can be utilized in conjunction with any type vessel, ship or barge, moored, anchored or aground at any location where oil boom is required. In the Figure, a steamship 44 is moored alongside a pier 46. An oil boom 50, of any of the types known in the art, encloses the seaward side of the ship to preclude escape of any oil which might be discharged from above or below the waterline of the ship. If the ship were anchored out, or if the pier were open underneath so the oil could escape thereunder, the boom 50 would normally be rigged entirely around the ship. A series of devices 36a, 36b, and 36c, in accordance with the inventions, are rigged along the starboard side of the ship and fend the boom 50 away from the hull as shown. The number of devices required to achieve this configuration of the boom depends on individual operational conditions such, for example, as current speed and direction, boom rigidity, boom tension and vessel length. Since the vessel is a steamship, care must also be taken to fend the boom 50 away from the ship's propeller 48 since, as described above, it is slowly being turned over by the ship's jacking gear. Due to the Shear of the vessel's hull under its counter, as is seen by the curvalinear dotted lines forward of the propeller 48, the distance that the boom 50 must be held off from the hull to clear the propeller is necessarily greater than the distance that the boom must be held off of the hull forward. The greater distance is accomplished by utilizing a device 42, of greater diameter than the devices 36, as is shown. Where the ship is anchored out or is completely surrounded by boom, two of the devices 42, one under each counter to accomodate changes in wind, current or tide, will be required.

The devices described above have utility other than that of fending devices in marine operations. In the event of an oil spill on the water, the device can be rigged with a depending skirt or oil boom around its periphery to form a floating verticle cylinder. Such an arrangement can then be used as a ready oil concentrator and container by pumping oil and water mixtures, skimmed from the water surface by conventional means, into the ring. The oil in the mixture will collect on the surface inside the ring while the water will gradually be displaced downward and out of the bottom into the body of water from which it came. When a sufficient thickness of oil has been accumulated, the concentrated oil can be pumped off into suitable tanks, trucks or vessels.

In addition to utilizing the device as a support in oil separating operations, the ring can also be used for other marine purposes such, for example, as a support for a shield for containing dredge spoils during dicharge spoils in dredging operations. In the later case, do to the requisite large size which may exist, the floatation could conceivably exist of inflatable elastomeric chambers or the like.

What has been set forth above is intended as exemplary of teachings in accordance with the invention to enable those skilled in the art to practice the invention.

What is new and desired to be protected by Letters Patent of the United States is:

1. A fending device for floating contaminent barriers comprising: an open planar structure; buoyant means associated with said structure to provide floatation thereof on water substantially coplanar to the surface of the water; and fender means extending transversely of the plane of said structure and extending above and below the waterline thereof to engage said barrier and block passage thereby.

2. A device in accordance with claim 1 further comprising bracing means connected to said structure and related to one another to form a ternary structural system maintaining the configuration of said structure under load in tension.

3. A device in accordance with claim 2 wherein said bracing means comprises tension elements.

4. A device in accordance with claim 3 wherein said structure is a substantially arcuate ring.

5. A device in accordance with claim 3 wherein said tension elements are disposed chordwise and form at least one triangle.

6. A device in accordance with claim 3 wherein said tension elements are disposed substantially radially.

7. A device in accordance with claim 2 wherein said buoyant means comprise buoyant collars disposed around said structure.

8. A device in accordance with claim 2 wherein said fender means comprises plural discreet members extending from said structure.

9. A device in accordance with claim 4 wherein said ring comprises three elongated members with interconnection means between the ends thereof to provide ready assembly and dissassembly thereof.

10. A device in accordance with claim 9 wherein said tension elements interconnect the ends of each of said elongated members.

* * * * *